United States Patent [19]

Ng

[11] Patent Number: 5,502,155
[45] Date of Patent: Mar. 26, 1996

[54] MANUFACTURE OF PARTIALLY AROMATIC POLYAMIDES

[75] Inventor: Howard C. Ng, Kingston, Canada

[73] Assignee: Du Pont Canada Inc., Mississauga, Canada

[21] Appl. No.: 205,228

[22] Filed: Mar. 3, 1994

[51] Int. Cl.$^6$ .................................................... C08G 69/78
[52] U.S. Cl. .......................... 528/349; 528/310; 528/324; 528/329.1; 528/335; 528/336; 528/338; 528/339; 528/340; 528/347
[58] Field of Search ........................... 528/349, 335, 528/338, 339, 340, 347, 329.1, 336, 310, 324

[56] References Cited

U.S. PATENT DOCUMENTS

| | | | |
|---|---|---|---|
| 3,538,056 | 11/1970 | Caldwell | 528/344 |
| 3,674,752 | 7/1972 | Ridgway et al. | 528/339 |
| 3,846,381 | 11/1974 | Kwok | 528/335 |
| 4,465,821 | 8/1984 | Nielinger et al. | 528/335 |
| 5,051,491 | 9/1991 | Pipper et al. | 528/335 |
| 5,185,427 | 2/1993 | Marks | 528/329.1 |
| 5,194,578 | 3/1993 | Anton | 528/335 |
| 5,270,437 | 12/1993 | Marks | 528/336 |
| 5,302,691 | 4/1994 | Soelch | 528/349 |
| 5,322,923 | 6/1994 | Lahary et al. | 528/340 |
| 5,378,800 | 1/1995 | Mok et al. | 528/340 |

FOREIGN PATENT DOCUMENTS

92/10525 6/1992 WIPO.

*Primary Examiner*—P. Hampton-Hightower

[57] ABSTRACT

A process for the manufacture of a partially aromatic polyamide is disclosed. The process comprises the polymerization stages of, in sequence, feeding to a reactor a slurry of at least one aromatic dicarboxylic acid and at least one aliphatic diamine, then with the incremental addition of water and in the presence of 0.05 to 2% by weight of a monocarboxylic acid, heating the slurry to a temperature of at least 270° C. while maintaining a pressure of at least 1.2 MPa. The preferred dicarboxylic acid is 2,6 naphthalene dicarboxylic acid. The polyamides may be used in the manufacture of products using melt processing techniques.

29 Claims, No Drawings

MANUFACTURE OF PARTIALLY AROMATIC POLYAMIDES

FIELD OF THE INVENTION

The present invention relates to a process for the manufacture of polyamides of aromatic dicarboxylic acids and aliphatic diamines, and especially to the manufacture of such polyamides in which the acid is terephthalic acid, isophthalic acid and/or a naphthalene dicarboxylic acid. The polyamides may be homopolymers or copolymers. The present invention also relates to certain homopolymers and copolymers of naphthalene dicarboxylic acids, especially 2,6 naphthalene dicarboxylic acid.

BACKGROUND OF THE INVENTION

Polymers formed from terephthalic acid and diamines are disclosed in PCT patent application WO92/10525 of S. L. Mok and R. U. Pagilagan, published 1992 Jun. 25, especially copolyamides of terephthalic acid with hexamethylene diamine and 2-methyl pentamethylene diamine, optionally containing isophthalic acid, having melting points of at least 280° C. In addition, R. R. Soelch discloses a process for the manufacture of such polymers in U.S. patent application No. 07/885,330 filed 1992 May 19.

The polymerization of 2,6-naphthalene dicarboxylic acid with branched diamines is disclosed and exemplified in U.S. Pat. No. 3,538,056 of J. R. Caldwell, issued 1970 Nov. 3. Copolyamides formed from hexamethylene diamine, adipic acid and 2,6-naphthalene dicarboxylic acid are disclosed in U.S. Pat. No. 3,674,752 of J. S. Ridgway et al, issued 1972 Jul. 4.

It has now been found that homopolymers and copolymers of aromatic dicarboxylic acids and aliphatic diamines may be manufactured in a slurry polymerization process in an improved manner.

SUMMARY OF THE INVENTION

Accordingly, the present invention provides a process for the manufacture of a partially aromatic polyamide comprising the polymerization stages of, in sequence:

(a) feeding to a reactor an admixture in the form of a slurry in aqueous solution, said admixture being formed from at least one aromatic dicarboxylic acid and at least one aliphatic diamine;

(b) with the incremental addition of water and in the presence of 0.05 to 2% by weight of a monocarboxylic acid, heating the slurry to a temperature of at least 270° C. while maintaining a pressure of at least 1.2 MPa;

(c) while maintaining said temperature at at least 270° C. and the pressure at at least 1.2 MPa, venting water and other volatile matter from the reactor;

(d) maintaining said temperature for a further period of time, and then while continuing to maintain the temperature at at least 270° C., reducing the pressure in the reactor to atmospheric pressure; and (e) discharging the polyamide so obtained from the reactor.

DETAILED DESCRIPTION OF PREFERRED EMBODIMENTS

In a preferred embodiment of the process of the present invention, prior to discharge from the reactor, the polyamide is subjected to a temperature of at least 270° C. for a further period of time with the pressure in the reactor being less than atmospheric pressure to increase the molecular weight of the polyamide being formed, preferably for a period of at least 15 minutes.

In another embodiment, the aromatic dicarboxylic acid is 2,6-naphthalene dicarboxylic acid or such acid admixed with another dicarboxylic acid.

In a further embodiment, the slurry contains the monocarboxylic acid, especially formic acid.

In yet another embodiment, the period of time in step (d) is at least 15 minutes.

In a still further embodiment, the aromatic dicarboxylic acid is admixed with at least one monomer selected from aliphatic diamines, aliphatic dicarboxylic acids, lactams, alpha,omega amino alkylene nitriles and alpha,omega aminocarboxylic acids, and mixtures thereof.

In another embodiment, the acid includes at least one of terephthalic acid, isophthalic acid and a naphthalene dicarboxylic acid, especially 2,6 naphthalene dicarboxylic acid.

The present invention also provides a melt-processible copolyamide derived from an alpha,omega alkylene dinitrile having 5–10 carbon atoms and a mixture of a naphthalene dicarboxylic acid with an aliphatic dicarboxylic acid having 4–14 carbon atoms.

The present invention further provides a melt-processible copolyamide derived from a mixture of an alpha,omega aminocarboxylic acid, an aliphatic diamine having 4–14 carbon atoms and a naphthalene dicarboxylic acid.

The present invention additionally provides a melt-processible copolyamide derived from a naphthalene dicarboxylic acid and a mixture of aliphatic diamines having 4–14 carbon atoms.

The present invention also provides a melt-processible copolyamide derived from an aliphatic diamine having 4–14 carbon atoms and an aromatic dicarboxylic acid in which 25– 70% of the aromatic dicarboxylic acid is 2,6 naphthalene dicarboxylic acid.

The present invention relates to the manufacture of polyamides from aromatic dicarboxylic acids and aliphatic diamines, and to certain of the resultant polyamides. Preferred aromatic carboxylic acids are terephthalic acid, isophthalic acid and a naphthalene dicarboxylic acid, or a mixture of such acids. Examples of naphthalene dicarboxylic acids include 1,4-, 1,5-, 2,6- and 2,7-naphthalene dicarboxylic acid. In a preferred embodiment, the naphthalene dicarboxylic acid is 2,6-naphthalene dicarboxylic acid, and preferably at least part of the acid used in the process is 2,6-naphthalene dicarboxylic acid. In other embodiments, the sole dicarboxylic acid is 2,6-naphthalene dicarboxylic acid. Alternatively, 2,6-naphthalene dicarboxylic acid is admixed with at least one other aromatic dicarboxylic acid viz. terephthalic acid and/or isophthalic acid. In further embodiments, 2,6-naphthalene dicarboxylic acid is admixed with at least one aliphatic carboxylic acid, lactam, alpha,omega aminoalkylene nitrile, alpha,omega alkylene dinitrile or alpha,omega aminocarboxylic acid. Examples of aliphatic dicarboxylic acids are 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid) and 1,12-dodecanedioic acid. An example of a lactam is caprolactam. An example of an alpha,omega aminoalkylene nitrile is 6-amino caproic nitrile. An example of an alpha,omega alkylene dinitrile is adiponitrile. Examples of alpha,omega aminocarboxylic acids are aminocaproic acid, amino octanoic acid, amino decanoic acid, amino undecanoic acid and amino dodecanoic acid.

The diamines used in the process may be branched or unbranched aliphatic diamines, especially such diamines having 5–12 carbon atoms in the aliphatic chain. Examples of such diamines are 1,6-hexamethylene diamine, 2-methyl pentamethylene diamine, 1,8-octamethylene diamine, 1,10-decamethylene diamine and 1,12-dodecamethylene diamine.

The amounts of acid and diamines should be substantially complementary on a molar basis, as will be appreciated by persons skilled in the art. An excess of acids or diamines, especially the latter, may be used depending on the desired characteristics of the polyamide and the nature and extent of side reactions that may produce volatile or other matter. Diamines tend to be more volatile than acids.

The polyamides produced by the process of the present invention are either partially crystalline polymers or amorphous polymers, depending on the composition of the polymer. In embodiments, the semi-crystalline polymers have a heat of fusion of greater than 17 J/g. Crystallinity may be determined using a differential scanning calorimeter (DSC).

In the polymerization process, the monomers together with any polymerization catalyst and other additives are admixed in the presence of a minimum amount of water. Many of the possible monomers, especially the aromatic dicarboxylic acids, are insoluble or substantially insoluble in water, and hence a slurry is formed, rather than a solution. The slurry is admixed so that the monomers are well dispersed and the slurry is in the form of a paste in aqueous medium. The monocarboxylic acid, especially formic acid, is preferably also included in the slurry, but it at least needs to be present in the reactor. The monocarboxylic acid is believed to act as both a polymerization control agent and a colour stabilizer. The monocarboxylic acid should be used in amounts of 0.05 to 2% by weight of the slurry fed to the reactor in step (a), especially 0.1 to 0.5 percent by weight.

The slurry is fed to a reactor, which is substantially of the type used in polymerization of polyamides. The slurry in the reactor is then heated to a temperature of at least 270° C., with the pressure being maintained at at least 1.2 MPa, during which time water is added to the reactor in an incremental manner. The rate of addition to the reactor is dependent on the size of the reactor and the amounts of reactants charged to the reactor. The optimal rate is determined empirically, and is such that the temperature and pressure in the reactor increase smoothly. Water is added continuously until the predetermined temperature and pressure are reached, the minimums being 270° C. and 1.2 MPa respectively.

After a period of time, which is dependent on the polymer and the properties thereof that is to be manufactured but which is usually in the range of 15 minutes to 2 hours, water and other volatile matter are vented from the reactor. During this step, the temperature is maintained at at least 270° C. and the pressure at at least 1.2 MPa; the period of time in this stage is determined primarily by the required properties of the polymer e.g. molecular weight and colour. Subsequently, the pressure is reduced to atmospheric pressure, by gradual and controlled reduction in pressure, with the temperature being maintained at at least 270° C. Subsequently the polyamide in the reactor may be and preferably is subjected to a vacuum finishing step in which the pressure in the reactor is reduced to below atmospheric pressure by application of a vacuum e.g. a pressure of 70 kPa or less, in order to increase the molecular weight of the polymer. Polymer temperature is maintained at at least 270° C. The polyamide is then discharged from the reactor.

As is known, diamines tend to be more volatile than carboxylic acids and thus it may be desirable to feed an excess of diamine to the reactor. Catalysts may also be used e.g. phosphinic acid and/or the sodium or potassium salts thereof, phosphorus acid, hypophosphorous acid, sodium hypophosphite, phosphoric acid and the like; typical amounts of catalysts are 0.05–1.00% by weight, especially 0.10–0.20% by weight.

In the process, the aqueous admixture of monomers is heated in a reactor (autoclave) under pressure. The actual pressure used will depend in part on the particular polyamide that is to be produced in the process. In preferred embodiments, the pressure is at least 1200 kPa, preferably at least 1700 kPa. The polymerization temperature should be maintained as low as practical, as use of higher temperatures tends to lead to both discoloration of the polymer and branching and other side reactions. Nonetheless, the temperature must be sufficiently high to effect polymerization, and to do so at a practical rate. In particular, the temperature should be at least 270° C. and preferably in the range of 275° C. to 325° C.

During pressure reduction, the pressure should be reduced in a manner that minimizes or avoids excessive foaming of the reaction mixture in the reactor. Anti-foam agents may be added to reduce the amount of foaming.

The present invention provides a copolyamide derived from an alpha,omega alkylene dinitrile having 5–10 carbon atoms, especially adiponitrile, and a mixture of a naphthalene dicarboxylic acid, especially 2,6 naphthalene dicarboxylic acid, and an aliphatic dicarboxylic acid having 4–14 carbon atoms. Preferably, the aliphatic dicarboxylic acid has 6–12 carbon atoms, especially adipic acid. In embodiments, the copolyamide is derived from a mixture of dinitrile, an aliphatic diamine having 4–14 carbon atoms and such acids. The amount of naphthalene dicarboxylic acid is preferably at least 25%, molar basis, of the total amount of dicarboxylic acid. In preferred embodiments, the copolyamide is derived from an admixture of dinitrile and diamine in a ratio in the range of 60:40 to 40:60 and naphthalene dicarboxylic acid and aliphatic dicarboxylic acid in a ratio in the range of 60:40 to 40:60. The diamine may be branched or unbranched aliphatic diamine.

In another embodiment of the copolyamides of the invention, the melt-processible copolyamide is derived from a mixture of an alpha,omega aminocarboxylic acid, an aliphatic diamine having 4–14 carbon atoms and a naphthalene dicarboxylic acid. The preferred acid is 2,6 naphthalene dicarboxylic acid. In embodiments, the ratio of alpha,omega aminocarboxylic acid to naphthalene dicarboxylic acid is in the range of 30:70 to 70:30. In particular, the alpha,omega aminocarboxylic acid is alpha,omega amino caproic acid. In a further embodiment, the invention provides a melt-processible copolyamide derived from a naphthalene dicarboxylic acid and a mixture of aliphatic diamines having 4–14 carbon atoms. The preferred acid is 2,6 naphthalene dicarboxylic acid. The acid may be a mixture of naphthalene dicarboxylic acid and another aromatic acid, especially terephthalic acid.

In other embodiments, the melt-processible copolyamide is derived from an aliphatic diamine having 4–14 carbon atoms and an aromatic dicarboxylic acid in which 25–70% of the aromatic dicarboxylic acid is 2,6 naphthalene dicarboxylic acid. Preferably, the copolyamide is derived from an aliphatic diamine and an aromatic dicarboxylic acid in which 25–70% especially 40–60%, of the aromatic dicarboxylic acid is 2,6 naphthalene dicarboxylic acid.

In preferred embodiments of the copolyamides of the invention, the aliphatic diamine comprises 2-methyl pentamethylene diamine.

As is illustrated hereinafter, the copolyamides of the invention may be amorphous polymers or semi-crystalline polymers.

The polyamides of the invention, including the polyamides obtained from the process of the invention, may be blended with stabilizers, flame retardants, smoke depressants, plasticizers, conductive and/or anti-static agents, lubricants and mould release agents, nucleating agents, dyes and pigments, fillers including glass fibres, minerals, toughening and other modifying agents, and other additives that may be used in polyamide compositions. Examples of heat stabilizers include copper(I) halides e.g. bromide and iodide, and alkali halides e.g. lithium, sodium and potassium bromides and iodides, which may be used with or without phosphorus compounds. Examples of the latter are phosphites, phosphines, phosphates and alkali metal salts of phosphorus acids e.g. sodium phenyl phosphinate, sodium hypophosphite, triaryl- and tris(alkylaryl) phosphines e.g. tri-n-butyl phosphine, phenyl dimethyl phosphine and triphenyl phosphine. The organic heat stabilizers include hindered phenols and hindered amines, as well as UV stabilizers and phenolic metal deactivators. Nucleating agents include talc, calcium fluoride and salts of phosphorus acids, for example sodium phenyl phosphinate.

A wide range of fillers may be used e.g. in amounts of 0.5–200 parts of filler per 100 parts of polyamide. Examples of such fillers include, but are not limited to, silica, metasilicates, alumina, talc, diatomaceous earth, clay, kaolin, quartz, glass, mica, titanium dioxide, molybdenum disulphide, gypsum, iron oxide, zinc oxide, fibres e.g. glass, carbon, boron, aromatic and ceramic fibres, powdered polytetrafluoroethylene and the like.

The polyamides may be used in the manufacture of products using melt processing techniques, especially products intended for use at temperatures that are higher than those typically used with other polyamides. For example, the polyamides may be formed into articles using injection moulding technology e.g. into valves, tanks, containers, washers and the like for automotive end-uses, into articles for electrical end-uses e.g. parts requiring resistance to temperatures of 260° C. or above, and articles where retention of mechanical properties under the influence of heat, moisture, hydrocarbons, alcohols including so-called gasohol, and the like are important. Alternatively, the polymers may be spun into fibres e.g. for sewing or industrial threads for end-uses where low shrinkage and elongation are important and/or retention of properties under the influence of moisture, hydrocarbons, alcohols and the like is important. The polyamides may also be formed into film and sheet. Barrier properties of the polyamides to water and oxygen may also find uses. The polyamides may be particularly useful for end-uses where retention of properties at elevated temperatures is required, including as retortable containers.

In embodiments of the invention, the polyamide is in the form of a fibre, or filament. The fibre preferably has a tenacity of at least 1.5 g/denier and a modulus of at least 30 g/denier.

The present invention is illustrated by the following examples.

EXAMPLE I

This comparative example illustrates an attempted synthesis of a 2,6-naphthalene dicarboxylic acid-containing polyamide i.e. a 2,6 N polyamide, by a conventional melt polycondensation method.

A 50 mL reaction vessel equipped with a propeller agitator was charged with 8.84 g (0.0393 moles) of 2,6 naphthalene dicarboxylic acid (2,6N), 1.70 g (0.0098 moles of suberic acid and 13.3 g of water. 9.85 g (0.0493 moles) of molten dodecamethylene diamine (DDMD) were then added to the vessel and the reaction mixture thoroughly mixed. The vessel was cycled 5 times with nitrogen to a pressure of 1.38 MPa.

With the agitator rotating at 50 rpm, the mixture was heated to 100° C., vented and sealed. The heating was repeated again to 150° C., vented for 5 minutes and then heated to 300° C. With the reaction pressure maintained at 1.72 MPa, volatile matter was released over a period of 45 minutes, during which period of time the temperature of the reaction mixture was controlled at 300° C. The pressure in the reaction mixture was then reduced to atmospheric pressure over a period of 20 minutes, the temperature in the reaction mixture being maintained at 300° C. The rate of agitation was reduced to 5 rpm. The reaction mixture was maintained at atmospheric pressure for 5 minutes and then was cooled to room temperature overnight.

The product isolated from the vessel was a dark grey intractable solid mass, with signs of thermal degradation evident on the surface.

The entire process was repeated and again yielded a similar badly discolored, intractable solid product.

No polymer data were available because of the intractability of the products. This example illustrates that a conventional melt polymerization technique failed to provide acceptable polymer from 2,6 naphthalene dicarboxylic acid.

EXAMPLE II

Preparation of Homopolymer of Dodecamethylene Diamine (DDMD) and 2,6-Naphthalene Dicarboxylic Acid (N) viz. 12N Polymer Preparation of 12N Salt 50 g (0.231 moles) of 2,6N and 47 g (0.235 moles) of DDMD were added to 2 L deionized water at 60° C. and the mixture heated to 90° C.; the mixture was stirred vigorously to break up any solid clumps. When the mixture appeared to be a milky and homogeneous slurry, and the temperature had reached 95° C., it was cooled to ambient temperature and stored overnight. The solid precipitate (12N salt) was filtered and dried in a vacuum oven under a nitrogen purge at 80° C. for 24 hours.

Product yield: 99.6%, melting point: 262.6° C.
Polymerization of 12N

A 300 mL reaction vessel equipped with an impeller agitator was charged with a premixed paste made up from 40 g (0.0962 moles) of 12N salt, 20 mL water and 3 mL 5% aqueous formic acid (weight basis) (0.00326 moles). The reactants were flushed and blanketed with nitrogen, sealed and heated up to 315° C. with water injected into the reaction vessel at 30 ml/hour. Stirring was kept at 190 rpm. When the pressure reached 1.72 MPa at 315° C., the water injection was stopped. The reaction vessel was then vented to atmospheric pressure over 25 minutes, with the temperature being maintained at 315° C.; this was continued for 1 hour. The rate of agitation was then reduced to 5 rpm. The reaction mixture was maintained under a vacuum of 67 kPa for 30 minutes at 315° C. and then cooled overnight.

The polymer obtained was a white porous solid, 34.6 g in yield, and had an inherent viscosity (IV) of 1.26 dL/g; inherent viscosity was measured on a 5.0 g/L solution in sulfuric acid. The polymer had a single melting point of 303.4° C., as measured by differential scanning calorimetry (DSC), and a thermal decomposition point under nitrogen of 477.5° C., as measured by thermal gravimetric analysis (TGA).

The above procedure for the polymerization of 12N was repeated with the formic acid solution being replaced by 0.31 g (0.0052 moles) of acetic acid. A tractable polymer was obtained in good yield (35.8 g) but was discoloured (green). The polymer had an IV of 0.56 dL/g, melting point of 296.2° C. and thermally decomposed at 474.3° C. under nitrogen.

EXAMPLE III

Preparation of Homopolymer of Hexamethylene Diamine and 2,6-Naphthalene Dicarboxylic Acid viz. 6N Polymer The 6N salt was prepared using a method similar to that described in Example II for the preparation of 12N salt. The salt had a melting point of 291.5° C.

The polymer of 6N was prepared using the procedure of Example II. The composition of the initial slurry mixture charged to the reaction vessel was: 6N salt, 40 g (0.120 moles); water, 20 mL; 5% aqueous formic acid, 3 mL (0.00326 moles).

The polymer obtained was a white powdery solid (34.7 g recovered). The inherent viscosity (IV) was 0.66 dL/g, melting point was 401° C. and thermal decomposition temperature was 473° C.

The polymerization of 6N was repeated with the formic acid solution being replaced by 0.31 (0.0052 moles) of acetic acid. A tractable polymer was obtained in good yield (34.3 g) but was discolored (tan). The polymer had an IV of 0.66 dL/g, melting point of 397.7° C. and thermally decomposed at 471° C. under nitrogen.

EXAMPLE IV

Preparation of Homopolymer of 2-Methyl Pentamethylene Diamine (D) and 2,6 Naphthalene Dicarboxylic Acid (N) viz. DN Polymer The DN salt was prepared using the method of Example II. The salt had a melting point of 298.8° C.

The polymer of DN was prepared using the procedure of Example II. The composition of the initial slurry mixture charged to the reaction vessel was: DN salt, 40 g (0.120 moles); water, 20 mL; 5% aqueous formic acid, 3 mL (0.00326 moles).

The polymer obtained was a solid having a light yellow colour, 34.4 g in yield. The inherent viscosity (IV) was 0.40 dL/g, melting point was 309° C. and the thermal decomposition temperature was 475.7° C.

EXAMPLE V

Preparation of Copolymer of Hexamethylene Diamine, 2-Methyl Pentamethylene Diamine (D) and 2,6-Naphthalene Dicarboxylic Acid (N) viz. 6N/DN, 50/50 Mole % Copolymer A premixed paste of 20 g (0.060 moles) of 6N salt, 20 g (0.060 moles) of DN salt, 20 mL of water and 5 mL of 5% aqueous formic acid (0.00326 moles) was charged to an 300 mL reaction vessel. The polymerization procedure of Example II was used. The polymer obtained was a hard solid, white in color, 33.6 g in yield. The polymer had an inherent viscosity (IV) of 0.66 dL/g, had a melting point of 341.1° C. and thermal decomposition temperature of 471.2° C.

EXAMPLE VI

Preparation of Copolymer of Dodecamethylene Diamine, 2-Methyl Pentamethylene Diamine (D) and 2,6-Naphthalene Dicarboxylic Acid (N) viz. 12N/DN, 50/50 Mole % Polymer A premixed paste of 20 g (0.060 moles) of DN salt, 25.1 g (0.060 moles) of 12N salt, 22.5 mL water and 3 mL of 5% aqueous formic acid (0.00326 moles) was charged to an 300 mL reaction vessel. The polymerization procedure of Example II was used. The polymer obtained was a hard solid, yellow in color, with an IV of 0.59 dL/g. It had a melting point of 250.8° C., and thermally decomposed at 473.9° C. under nitrogen.

EXAMPLE VII

Preparation of Copolymer of Hexamethylene Diamine, 2-Methyl Pentamethylene Diamine (D), Terephthalic Acid (T) and 2,6-Naphthalene Dicarboxylic Acid (N) viz. (6N/DT 50/50 Mole %) Polymer DT salt was prepared using the method described in Example II. The salt had a melting point of 270.9° C.

A premixed paste of 20 g (0.060 moles) of 6N salt, 17 g (0.060 moles) of DT salt, 20 mL water and 3 mL of 5% aqueous formic acid (0.00326 moles) was charged to an 300 mL reaction vessel. The polymerization procedure of Example II was used. The polymer obtained was a hard solid, yellow in color, with a yield of 27.5 g. The IV was 0.61 dL/g. The polymer appeared amorphous as no melting point was observed on DSC. The polymer decomposed thermally at 471.8° C.

EXAMPLE VIII

Preparation of Copolymer of Hexamethylene Diamine, Terephthalic Acid (T) and 2,6 Naphthalene Dicarboxylic Acid (N) viz. 6N/6T 50/50 Mole % Polymer 6T salt was prepared using the method of Example II. The salt had a melting point of 278.0° C.

A premixed paste of 20 g (0.060 moles) of 6N salt, 17 g (0.060 moles) of 6T salt, 20 mL water and 3 mL of 5% aqueous formic acid (0.00326 moles) was charged to an 300 mL reaction vessel. The polymerization procedure of Example II was used.

The polymer obtained was a brittle, off colored (brown) solid, 30.9 g in yield, and with an IV of 0.33 dL/g. The polymer had a melting point of 336.5° C. and thermally decomposed at 469.4° C. under nitrogen.

EXAMPLE IX

Preparation of Copolymer of Hexamethylene Diamine, 2-Methyl Pentamethylene Diamine (D) and Terephthalic Acid (T) viz. 6T/DT 50/50 Mole % Polymer A 10 L reaction vessel equipped with a helical ribbon agitator was charged with 1320 g (7.95 moles) of terephthalic acid, 637 g of 73.52% (weight basis) of aqueous hexamethylene diamine solution (4.04 moles), 485 g (4.33 moles) of 2-methyl pentamethylene diamine, 169 mL of 5% aqueous formic acid (0.184 moles) and 1125 g water. The mixture in the reaction vessel was thoroughly mixed.

With the agitator rotating at 50 rpm, the mixture was heated to 130° C., vented to remove entrained oxygen and then sealed. The reaction mixture was heated up to 315° C. with water injected into the reaction vessel at 37.5 mL/min; stirring was maintained at 50 rpm. When the pressure reached 1.72 MPa at 315° C., the water injection was stopped. The reaction vessel was then vented to atmospheric pressure over 25 minutes, while the temperature was maintained at 315° C.; the resultant conditions were was held for 1 hour. The rate of agitation was then reduced to 5 rpm. The reaction mixture was maintained under a vacuum of 67 kPa for 15 minutes at 315° C., and then the polymer obtained was discharged from the reactor and quenched in a water bath.

The polymer obtained was a white off color solid and had an IV of 1.02 dL/g measured on a 5.0 g/L solution in m-cresol. The number of amine ends in the polymer was 28.4 meq/Kg, carboxyl ends 48.3 meq/Kg. The polymer had a melting point of 300.6° C.

EXAMPLE X

Preparation of Copolymer of Hexamethylene Diamine, 2,6-Naphthalene Dicarboxylic Acid (N) and Omega Amino Capronitrile viz. 6/6N 60/40 Mole % Polymer A 300 mL reaction vessel equipped with an impeller agitator was charged with a premixed slurry of 79 g (0.238 moles) of 6N salt, 40 g (0.357 moles) of omega amino capronitrile, 16 g water, 6.8 g of 5% aqueous formic acid (0.0074 moles) and 0.7 mL 10% (weight basis) aqueous phosphoric acid (0.00071 moles). The reactants had been premixed into a homogenous paste before charging to the reaction vessel. In the reaction vessel, the reactants were flushed and blanketed with nitrogen, and then heated to 225° C. with the agitator at 200 rpm. Water injection to the reaction mixture began at 225° C. and at a rate of 30 mL/hr. The heating continued until the temperature reached 275° C., with the pressure being controlled at a maximum of 1.38 MPa, for 100 minutes. Water injection was then stopped and the pressure vented down to atmospheric pressure, with temperature being maintained at 275° C., over a period of 60 minutes. The rate of agitation was reduced to 5 rpm. The reaction mixture was maintained under vacuum of 67 kPa at 275° C. for 30 minutes, and then was cooled to room temperature overnight.

The polymer obtained was a white hard solid, 98.7 g in yield, containing 4% extractibles (from water extraction). The IV of the polymer after extraction was 0.46 dL/g (in sulfuric acid). The polymer was amorphous as no melting point was observed using a DSC. The thermal decomposition temperature under nitrogen was 461.3° C.

EXAMPLE XI

Preparation of Copolymer of 2-Methyl Pentamethylene Diamine (D), 2,6-Naphthalene Dicarboxylic Acid (N) and Omega Amino Capronitrile viz. 6/DN 60/40 Mole % Polymer A premixed paste of 63.2 g (0.190 moles) of DN salt, 32 g (0.286 moles) of omega amino capronitrile, 12.8 mL water, 5.5 g of 5% aqueous formic acid (0.006 moles) 0.6 g of 10% phosphoric acid (0.00061 moles) was charged to an 300 mL reaction vessel. The polymerization procedure of Example X was followed, except the final pressure in the reaction vessel before pressure reduction was 1.72 MPa.

The polymer obtained was a hard solid, translucent/white in color, 68.5 g in yield. The polymer contained 2% water extractibles (from water extraction). The IV of the polymer after extraction was 0.63 dL/g (in sulfuric acid). The polymer was amorphous as no melting point was observed using DSC. The thermal decomposition temperature under nitrogen was 446.5° C.

EXAMPLE XII

Preparation of Copolymer of Hexamethylene Diamine, 2,6 Naphthalene Dicarboxylic Acid (N) and Adiponitrile viz. 66/6N 60/40 Mole % Polymer A 300 mL reaction vessel equipped with an impeller agitator was charged with a premixed slurry of 79 g (0.238 moles) of 6N salt, 42 g (0.362 moles) of hexamethylene diamine, 38.6 g (0.357 moles) of adiponitrile, 20 mL water, 6.8 g of 5% aqueous formic acid (0.0074 moles) and 0.7 mL 10% aqueous hypophosphorous acid (0.0011 moles). The reactants had been premixed into a homogeneous paste before charging to the reaction vessel. The reactants were flushed and blanketed by nitrogen, and heated to 225° C. with the agitator at 200 rpm. Water injection began at 225° C. at 30 mL/hr. When the pressure in the reaction vessel reached 1.72 MPa and the temperature reached 275° C., the condition was maintained constant by partially releasing the pressure for 60 minutes. After this holding period, the water injection was stopped and the pressure vented down to atmospheric at 275° C. over 60 minutes. The rate of agitation was reduced to 5rpm. The reaction mixture was maintained under a vacuum of 67 kPa at 275° C. for 30 minutes, then was cooled down overnight.

The polymer obtained was a white powdery solid, 132.5 g in yield, and with an IV of 0.94 dL/g. No melting point was observed on DSC. The polymer decomposed thermally at 461.2°. IR analysis indicated that the nitrile conversion (from adiponitrile to adipamide) was complete.

EXAMPLE XIII

Preparation of Copolymer of Hexamethylene Diamine, Dodecamethylene Diamine, 2,6-Naphthalene Dicarboxylic Acid (N) and Adiponitrile viz. 66/12N, 60/40 Mole % Polymer.

A premixed paste of 50 g (0.120 moles) of 12N salt, 21.5 g (0.185 moles) of hexamethylene diamine, 19.5 g (0.181 moles) of adiponitrile, 35 mL of water, 4.6 g of 5% aqueous formic acid (0.005 moles) and 0.4 mL of 10% hypophosphorous acid (0.00061 moles) was charged to an 300 mL reaction vessel. The polymerization procedure of Example XII was followed.

The polymer obtained was a white, porous solid, 70.4 g in yield, and with an IV of 0.84 dL/g. No melting point was observed in DSC (amorphous). The polymer decomposed thermally under nitrogen at 465.4° C.

The polymerization was repeated using the same procedure except that 0.5 mL of 10% aqueous zinc chloride solution (0.00037 moles) was used instead of the hypophosphorous acid.

The polymer obtained was a white hard solid, 128.7 g in yield. The polymer had an IV of 0.67 dL/g. It had no apparent melting point using DSC. Its thermal decomposition temperature under nitrogen was 453.8° C.

Table I summarizes properties of partially aromatic polyamides manufactured by the method described in the examples herein.

| POLYMER COMPOSITION | IV* (dL/g) | M.P. °C. | THERMAL DECOMPOSITION TEMP. °C. |
|---|---|---|---|
| HOMOPOLYMERS OF ALIPHATIC DIAMINES AND AROMATIC DIACIDS | | | |
| 12N | 1.26 | 303.4 | 477.5 |
| 6N | 0.66 | 401 | 473 |
| DN | 0.40 | 309 | 475.7 |
| COPOLYMERS OF ALIPHATIC DIAMINES AND AROMATIC DIACIDS | | | |
| 6N/DN (50/50)** | 0.66 | 341.1 | 471.2 |
| 12N/DN (50/50) | 0.59 | 250.8 | 473.9 |
| 6N/DT (50/50) | 0.61 | AMORPHOUS | 471.8 |
| 6N/6T (50/50) | 0.33 | 336.5 | 469.4 |
| 6T/DT (50/50) | 1.02*** | 300.6 | — |
| COPOLYMERS OF ALIPHATIC DIAMINES, AROMATIC DIACIDS AND OMEGA AMINO ALKYLENE NITRILE | | | |
| 6/6N (60/40) | 0.46 | AMORPHOUS | 461.3 |
| 6/DN (60/40) | 0.63 | AMORPHOUS | 446.5 |
| 6/12N (60/40) | 0.45 | 230.4 | 476.5 |
| COPOLYMERS OF ALIPHATIC DIAMINES, AROMATIC DIACIDS AND $\alpha,\omega$-ALKYLENE DINITRILES | | | |
| 66/6N (60/40) | 0.94 | AMORPHOUS | 461.2 |
| 66/12N (60/40 | 0.84 | AMORPHOUS | 465.4 |
| 66/DN (60/40) | 0.67 | AMORPHOUS | 453.8 |

*IV = Inherent viscosity was measured on a 5.0 g/L solution in sulfuric acid.
**ratios are mole percent.
***IV measured on a 5.0 g/L solution in m-cresol.
N = 2,6-Naphthalene dicarboxylic acid.
T = Terephthalic acid
D = 2-Methyl pentamethylene diamine The polymer obtained was a white hard solid, 77.7 g in yield, and with an IV of 0.63 dL/g. No apparent melting point was observed using DSC and the polymer thermally decomposed at 458.5° C.

EXAMPLE XIV

Preparation of Copolymer of Hexamethylene Diamine, 2-Methyl Pentamethylene Diamine (D), 2,6-Naphthalene Dicarboxylic Acid (N) and Adiponitrile viz. 66/DN 60/40 Mole % Polymer A premixed paste of 79 g (0.238 moles) of DN salt, 42 g (0.362 moles) of hexamethylene diamine, 38.6 g (0.333 moles) of adiponitrile, 20 mL of water, 6.8 g of 5% formic acid (0.0074 moles) and 0.7 mL 10% hypophosphorous acid (0.0011 moles) was charged to an 300 mL reaction vessel. The polymerization procedure of Example XII was followed.

The polymer obtained was a white porous solid, 140.3 g in yield. The polymer had an IV of 0.74 dL/g. It had no apparent melting point on DSC. The thermal decomposition temperature under nitrogen was 454.4° C.

The polymerization was repeated using the same procedure except that 0.7 ml of 10% aqueous zinc chloride solution (0.00051 moles) was used to replace the hypophosphorous acid.

I claim:

1. A process for the manufacture of a partially aromatic polyamide comprising the polymerization stages of, in sequence:
   (a) feeding to a reactor an admixture in the form of a slurry in aqueous solution, said admixture being formed from at least one aromatic dicarboxylic acid and at least one aliphatic diamine;
   (b) with the incremental addition of water and in the presence of 0.05 to 2% by weight of a monocarboxylic acid selected from the group consisting of formic acid and acetic acid, heating the slurry to a temperature of at least 270° C. while maintaining a pressure of at least 1.2 MPa;
   (c) while maintaining said temperature at at least 270° C. and the pressure at at least 1.2 MPa, venting water and other volatile matter from the reactor;
   (d) maintaining said temperature for a further period of time, and then while continuing to maintain the temperature at at least 270° C., reducing the pressure in the reactor to atmospheric pressure; and
   (e) discharging the polyamide so obtained from the reactor.

2. The process of claim 1 in which, prior to discharge from the reactor, the polyamide is subjected to a temperature of at least 270° C. for a further period of time with the pressure in the reactor being less than atmospheric pressure to increase the molecular weight of the polyamide being formed.

3. The process of claim 2 in which the period of time is at least 15 minutes.

4. The process of claim 1 in which the aromatic dicarboxylic acid is 2,6-naphthalene dicarboxylic acid or such acid admixed with another dicarboxylic acid.

5. The process of claim 1 in which the slurry contains the monocarboxylic acid.

6. The process of claim 5 in which the monocarboxylic acid is formic acid.

7. The process of claim 1 in which the period of time in step (d) is at least 15 minutes.

8. The process of claim 1 in which the aromatic dicarboxylic acid is admixed with at least one monomer selected from the group consisting of aliphatic diamines, aliphatic dicarboxylic acids, lactams, alpha,omega amino alkylene nitriles, alpha,omega alkylene dinitriles and alpha,omega aminocarboxylic acids, and mixtures thereof.

9. The process of claim 3 in which the aromatic dicarboxylic acid includes at least one of terephthalic acid, isophthalic acid and a naphthalene dicarboxylic acid.

10. The process of claim 9 in which the naphthalene carboxylic acid is 2,6 naphthalene dicarboxylic acid.

11. The process of claim 9 in which the sole dicarboxylic acid is 2,6-naphthalene dicarboxylic acid.

12. The process of claim 1 in which the monocarboxylic acid is used in amounts of 0.1 to 0.5% by weight of the admixture fed in step (a).

13. A melt-processible copolyamide prepared from an alpha,omega alkylene dinitrile having 5–10 carbon atoms and a mixture of a naphthalene dicarboxylic acid with an aliphatic dicarboxylic acid having 4–14 carbon atoms.

14. The copolyamide of claim 13 in which the dinitrile is adiponitrile.

15. The copolyamide of claim 13 in which the acid is 2,6 naphthalene dicarboxylic acid.

16. The copolyamide of claim 15 in which the aliphatic dicarboxylic acid has 6–12 carbon atoms.

17. The copolyamide of claim 14 in which the aliphatic dicarboxylic acid is adipic acid.

18. The copolyamide of claim 13 in which the copolyamide is prepared from a mixture of dinitrile, an aliphatic diamine having 4–14 carbon atoms and said acids.

19. The copolyamide of claim 18 in which the aliphatic diamine comprises 2-methyl pentamethylene diamine.

20. The copolyamide of claim 13 in which the amount of naphthalene dicarboxylic acid is at least 25%, molar basis, of the total amount of dicarboxylic acid.

21. The prepared of claim 16 in which the copolyamide is prepared from an admixture of dinitrile and diamine in a ratio in the range of 60:40 to 40:60 and naphthalene dicarboxylic acid and aliphatic dicarboxylic acid in a ratio in the range of 60:40 to 40:60.

22. A melt-processible copolyamide prepared from a mixture of an alpha,omega aminocarboxylic acid, an aliphatic diamine having 4–14 carbon atoms and a naphthalene dicarboxylic acid.

23. The copolyamide of claim 22 in which the aliphatic diamine comprises 2-methyl pentamethylene diamine.

24. The copolyamide of claim 22 in which the acid is 2,6 naphthalene dicarboxylic acid.

25. The copolyamide of claim 23 in which the ratio of alpha,omega aminocarboxylic acid to naphthalene dicarboxylic acid is in the range of 30:70 to 70:30.

26. A melt-processible polyamide homopolymer prepared from a naphthalene dicarboxylic acid and a linear aliphatic diamine having 4–14 carbon atoms.

27. The polyamide homopolymer of claim 26 in which the acid is 2,6 naphthalene dicarboxylic acid.

28. The copolyamide of claim 13 in which the copolyamide is amorphous.

29. The copolyamide of claim 13 in which the copolyamide is semi-crystalline.

\* \* \* \* \*